(12) United States Patent
Arrouy

(10) Patent No.: US 7,506,840 B2
(45) Date of Patent: Mar. 24, 2009

(54) DEVICE FOR CONNECTING IN FLIGHT AN AIRCRAFT TO A REFUELLING DEVICE OF A TANKER AEROPLANE

(75) Inventor: Pascal Arrouy, Toulouse (FR)

(73) Assignee: AIRBUS France, Toulouse (FR)

( * ) Notice: Subject to any disclaimer, the term of this patent is extended or adjusted under 35 U.S.C. 154(b) by 57 days.

(21) Appl. No.: 11/575,377

(22) PCT Filed: Sep. 6, 2005

(86) PCT No.: PCT/FR2005/002209

§ 371 (c)(1),
(2), (4) Date: Mar. 15, 2007

(87) PCT Pub. No.: WO2006/032747

PCT Pub. Date: Mar. 30, 2006

(65) Prior Publication Data

US 2008/0061190 A1    Mar. 13, 2008

(30) Foreign Application Priority Data

Sep. 16, 2004   (FR)   .................................. 04 09808

(51) Int. Cl.
*B64D 39/00* (2006.01)

(52) U.S. Cl. ................................................. 244/135 A
(58) Field of Classification Search ............. 244/135 A, 244/1 TD, 136, 135 R, 137.1
See application file for complete search history.

(56) References Cited

FOREIGN PATENT DOCUMENTS

| GB | 695200  |   | 8/1953 |
| GB | 1472296 | * | 5/1977 |

OTHER PUBLICATIONS

PCT International Search Report dated Feb. 9, 2006 with English translation.

\* cited by examiner

*Primary Examiner*—Michael Carone
*Assistant Examiner*—Michael Kreiner
(74) *Attorney, Agent, or Firm*—Dickinson Wright, PLLC

(57) ABSTRACT

A connection device for in-flight connecting an aircraft to a refueling device of a tanker airplane has a support structure carrying a hollow connecting boom that is fixed to the fuselage structure. The support structure has a tubular cylindrical body with an internal passage, at least two parallel bearings carrying the cylindrical body and fixed to the fuselage structure, and an element longitudinally locking the cylindrical body along its longitudinal axis.

7 Claims, 2 Drawing Sheets

DEVICE FOR CONNECTING IN FLIGHT AN AIRCRAFT TO A REFUELLING DEVICE OF A TANKER AEROPLANE

FIELD OF THE INVENTION

The present invention relates to a device for connecting in flight an aircraft to a refueling device of a tanker airplane.

BACKGROUND OF THE RELATED ART

These connecting devices equip in particular military airplanes such as certain fighters or troop and/or hardware transporters, as well as helicopters, which, in order to successfully complete their mission, must be refueled during their flight.

Refueling is performed from a tanker airplane on which is provided at least one connecting device comprising a refueling pipe or the like in fluidic communication with at least one relevant tank of the tanker airplane and which, after linkage with the connecting device of the airplane to be refueled, provides for the transfer of fuel from the tank or tanks of the tanker airplane to the tank or tanks of the refueled airplane.

Of course, the tanker airplane may itself be equipped with a connecting device so as, in its turn, to be refueled in flight from another tanker airplane.

The connecting devices currently used onboard refueled aircraft generally comprise:

- a fixed connecting boom, which is hollow and able to cooperate via its distal end with the refueling device of the tanker airplane; and
- a support structure, fixed to the structure of the refueled aircraft, in particular to the top front part of the fuselage in its longitudinal plane of symmetry, said support structure serving as base fixed to said boom and being provided with an internal passage making it possible to join the proximal end of the connecting boom to a tank to be filled of said refueled aircraft.

Having regard to the loads engendered on the connecting boom when it is linked to the pipe of the refueling device and during the transfer of the fuel, the support structure which takes up and absorbs the loads (forces and moments) transmitted by the boom, is designed rigidly.

According to a first known embodiment, the support structure comprises an ax symmetric body with internal passage and three supports carrying the body. More particularly, to the front face of the body is joined the proximal end of the connecting boom, while the rear face of said body is joined to fluidic piping to convey the fuel flowing through the internal passage of the body, to the tank. The three supports distributed along the body are, on the one hand, fixed to the latter and, on the other hand, rest externally on the skin of the fuselage while also being fixed to transverse structural frames of the fuselage, which are situated internally with respect to the skin, by way of fixing members.

The three supports then constitute built-in links embedded vis-à-vis the frames aimed at transmitting the loads in the frames, while the axisymmetric body opposes the bending moment imposed by the boom.

According to a second likewise known embodiment, the support structure of the boom is also composed of three supports fixed to the structural frames of the fuselage by way of the skin and joined fixedly together by plates so as to define a structure of the box type which is very rigid and whose interior forms the internal passage. The connecting boom is fixed, via its proximal end, to the front support of the box structure. This embodiment makes it possible to lessen the intensity of the stresses in the built-in embedding with the structure of the airplane, but has the drawback of adding a rigid and quasi-undeformable node to the fuselage.

Although they are widely used, these connecting devices nevertheless have drawbacks, chiefly by reason of their rigidity.

Specifically, if these built-in solutions make it possible to efficiently take up the loads exerted on the connecting boom and transmitted by the latter during linkage thereof to the tanker airplane's refueling device, on the other hand they disturb the surrounding structure of the refueled airplane, which cannot deploy in an optimal manner since all the movements apt to occur are disabled in proximity to the built-in embedding. Consequently, as the structure of the fuselage is designed to be able to "breathe" during flight following pressure variations between the interior of the airplane and the exterior environment, the prevention of these movements through the rigidity of the "support structure-fuselage structure" link may lead to the appearance of cracks in them. A solution then consists in strengthening the zone of the relevant structure so as to decrease the level of the stresses, but it makes the whole assembly heavier and even further rigidities said zone, so that the overdimensioned structure absorbs more load and new cracks appear.

For example, the structural frames have a C cross section to resist pressure. Thus, the web of each frame, perpendicular to the skin of the fuselage, works in shear and its lower flange or heel makes it possible to avoid the warping or distortion of the web, its upper flange being fixed to the respective support by fixings and the skin of the fuselage. If the radial loads introduced by the boom into the support structure are taken up well by the web of each support, on the other hand, the axial load imposes a secondary moment on the frame which tends to bring about the warping of the web. A strengthener is then adjoined to the web to rigidify each support but this solution then brings about an increase in the weight and the increase in the rigidification brings about the appearance of cracks.

SUMMARY OF THE INVENTION

The present invention is aimed at remedying these drawbacks and relates to a connecting device, the design of whose support structure makes it possible in particular to avoid the deformation of the frames, the appearance of cracks and the use of numerous strengtheners.

For this purpose, according to the invention, the connecting device for the refueling, in flight, of a refueled aircraft, such as an airplane, from a tanker airplane provided with a refueling device, said connecting device being carried by said refueled aircraft and comprising:

- a fixed connecting boom, which is hollow and able to cooperate with said refueling device of said tanker airplane; and
- a support structure, fixed to the fuselage structure of said refueled aircraft and serving as base fixed to said connecting boom, said support structure being provided with an internal passage in communication with said connecting boom, is noteworthy in that said support structure comprises,

- a tubular cylindrical body comprising said internal passage;
- at least two parallel bearings, carrying said cylindrical body and fixed to said structure of the fuselage, and able to take up the radial loads engendered and transmitted by said connecting boom; and
- an element for longitudinal locking of said cylindrical body along its longitudinal axis, associating said body with said structure of the fuselage and able to take up the axial loads engendered and transmitted by said connecting boom.

Thus, instead of built-in embedded links from the support structure of the device to the structure of the fuselage which indifferently transmit all the loads to the structure of the fuselage and bring about deformations and the appearance of cracks thereon, the embodying of the support structure according to the invention in the form of a tubular cylindrical body fixed, on the one hand, by bearings and, on the other hand, by a longitudinal locking element makes it possible to dissociate the loads transmitted by the connecting boom on the structure of the fuselage and avoid the aforesaid drawbacks.

Specifically, the bearings act as short centering shims capable of taking up the radial loads transmitted by the boom to the tubular body while permitting rotations and, in a limited manner, angular displacements making it possible to best follow the movements of the boom, so that the webs of the structural frames parallel to said bearings advantageously work only in their plane and thus do not deform. The longitudinal locking element is for its part envisaged for preventing longitudinal movement and thus for taking up the axial loads parallel to the boom.

Preferably, said bearings are respectively situated in line with the webs of the transverse frames of said structure of the fuselage and fixed to them by way of the skin of said fuselage, so that the webs of the frames, in the same plane as the bearings, work in an optimal manner.

In particular, said bearings are arranged substantially in the neighborhood of the ends of said tubular cylindrical body, and said longitudinal locking element is situated between said bearings. To obtain such a link by short centering shim, said bearings have a relatively narrow width in comparison to their internal diameter receiving, with adjustment, said tubular cylindrical body. Preferably, the ratio of the internal diameter to the width of each bearing is of the order of 10. For example, the bearings may be smooth or have elastic or spherical articulation.

In a preferred embodiment, said longitudinal locking element comprises at least one thin plate forming a panel, disposed along the vertical longitudinal plane of said body, orthogonally to said bearings, and joining said body to the skin of the structure of the fuselage. It is noted that the thin plate thus arranged, tied directly to the skin of the fuselage, works in shear and avoids introducing a secondary moment into the structure of the fuselage.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
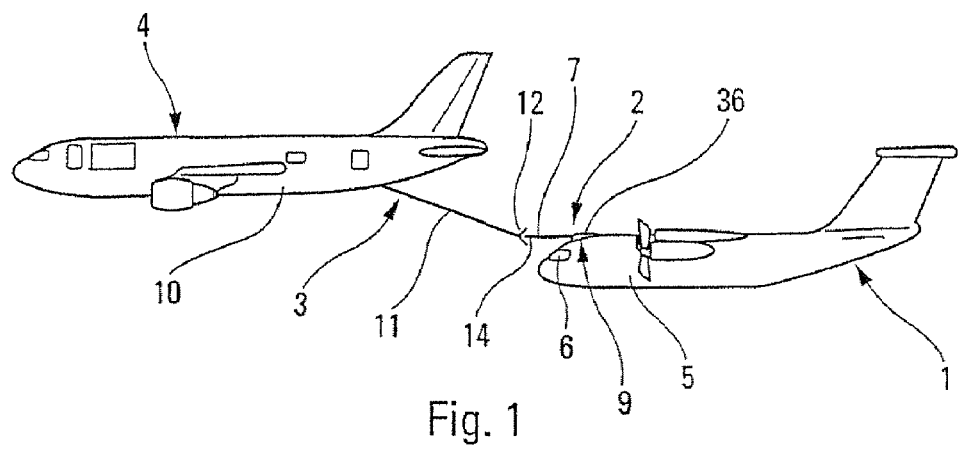
FIG. 1 diagrammatically shows the refueling in flight of an airplane to be refueled equipped with a connecting device according to the invention by way of the refueling device of a tanker airplane.

The refueled airplane 1, represented in FIG. 1, is equipped with a connecting device 2 able to cooperate with a refueling device 3 provided in the tanker airplane 4. For this purpose, the connecting device 2 is situated at the front of the fuselage structure 5 of the refueled airplane 1 substantially in its longitudinal plane of symmetry and above the flight deck 6 and it comprises a connecting boom 7, fixed and hollow, projecting from the front of the fuselage and coupled up rigidly and in a leak-tight manner, by its proximal end 8, to a support structure 9. The latter is secured to the structure of the fuselage 5 and in fluidic communication with a tank to be filled (not represented). This support structure 9 thus constitutes a base fixed to the fuselage 5 for the fixing of the boom 7. The refueling device 3 is situated, in the present example, under the rear of the fuselage 10 of the tanker airplane 4 and it comprises, for example, a refueling pipe 11 emanating from a pod or from a winch (not represented) in said fuselage 10. The pipe 11 terminates in a conical guide basket 12, facilitating the introduction and the linking of the distal end 14 of the connecting boom 7.

Although FIG. 1 represents a transport airplane 1 as airplane to be refueled, it goes without saying that the connecting device 2 could be mounted on other types of airplanes, such as fighters.

Figure 2:
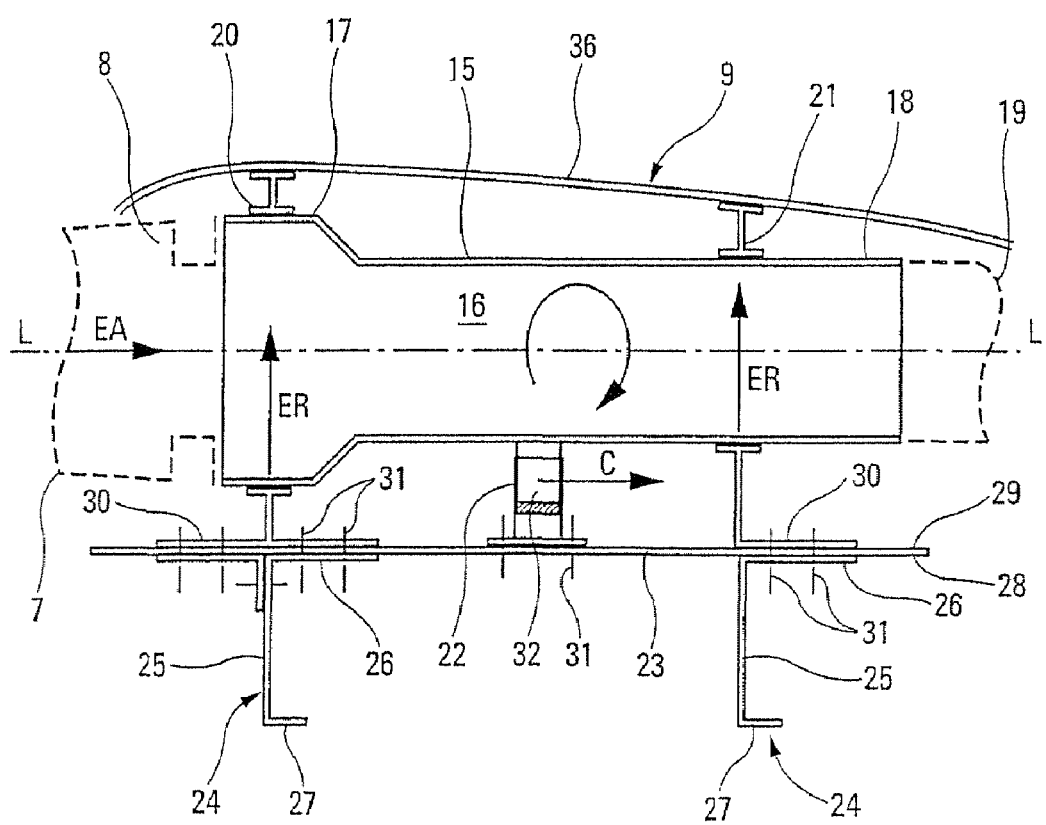
FIG. 2 is a diagrammatic view in longitudinal section of the connecting device.

As shown in FIG. 2, the support structure or carrying base 9 of the connecting device 2 takes the form of a tubular cylindrical body 15, with axial internal through-passage 16 for transferring the fuel, the longitudinal axis L-L of the tubular body being substantially parallel to the fuselage 5 of the airplane 1. The front transverse end 17 of the body fixedly receives the proximal end 8 of the connecting boom 7, while its rear transverse end 18 is connected in a leak-tight manner to linking piping 19 partially represented by dashes leading to said tank to be filled.

The support structure 9 is tied to the structure of the fuselage 5 and, for this purpose, it advantageously comprises two parallel bearings 20, 21 surrounding, with adjustment, the tubular cylindrical body 15 and fixed to the structure of the fuselage 5, and an element for longitudinal locking 22 of the body fixed to said structure of the fuselage.

More particularly, the structure of the fuselage 5 of the airplane is composed chiefly of a metal skin 23 constituting the cladding of the fuselage, and of rigid structural frames 24 disposed transversely along the skin, under the latter. These frames 24 have a substantially C-shaped cross section and each comprise, as indicated previously, a vertical web 25 terminating, on one side, in a horizontal footing 26 cooperating with the internal face 28 of the skin and, on the other side, in a heel 27 substantially parallel to the footing and pointing towards the interior of the fuselage 5. Internal claddings (not represented) are applied and fixed to the heels of the frames.

The two bearings 20 and 21 carrying the tubular body 15 are arranged in such a way as to be in line with the webs 25 of the two frames concerned 24, while being situated approximately at the level of the respective front and rear ends 17, 18 of the body. For their fixing to the fuselage, each bearing 20, 21 terminates in a base 30 which rests on the external face 29 of the skin 23, and means of fixing 31 (such as bolts, rivets, or the like) symbolized by their geometrical axis, rigidly unite the footing 26, the skin 23 and the base 30 of each bearing 20, 21 through holes made opposite them.

Figure 3:
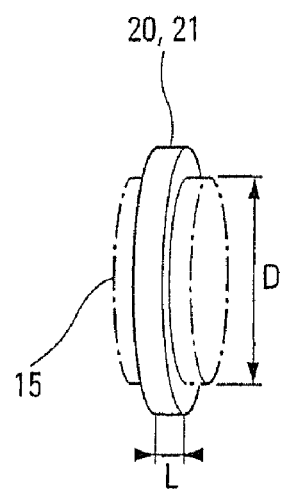
FIG. 3 shows in diagrammatic perspective the dimensional ratio of one of said bearings to the cylindrical body of said device.

These two bearings 20, 21 thus disposed constitute short centering shims which are aimed at taking up the radial loads ER engendered and transmitted by the connecting boom 7 when it is linked to the refueling pipe 11, while permitting rotations. Thus, this has the effect of making each frame 24 work normally along its web 25, that is to say in its plane without introducing other loads and/or moments, and of avoiding any warping or distortion of the frames and, thereby, the appearance of cracks. This is so, all the more as the web of each frame lies along the extension of its bearing, in the same vertical plane in FIG. 2. To achieve this link by short centering shim, the ratio of the width L of the bearings 20, 21 to the external diameter D of the tubular body 15 must be significant, for example equal to 10, as shown in FIG. 3. For example, the bearings may be smooth or have elastic or spherical articulation permitting limited angular displacements.

As regards the longitudinal locking element 22, intended to take up the axial loads EA emanating from the boom along the axis L-L of the tubular body 15, it takes the form of a thin plate or panel 32, as shown by its cross section in FIG. 2. This thin plate 32 joins the tubular body 15 to the skin 23 of the fuselage 5 by fixing means 31 and it is situated between the bearings 20 and 21, advantageously in the vertical longitudinal plane of symmetry of the fuselage 5, that is to say of the tubular body 15, so that it can take up sizeable axial loads without suffering deformation. Under the action of these loads, the plate 32 works in shear C taken up normally and directly by the skin in its plane without inducing any secondary moment.

Thus, by virtue of the embodiment of the support structure 9, the loads transmitted by the boom are dissociated and decomposed into radial loads taken up by the bearings 20, 21 and into axial loads taken up by the thin plate 32.

Figure 4:
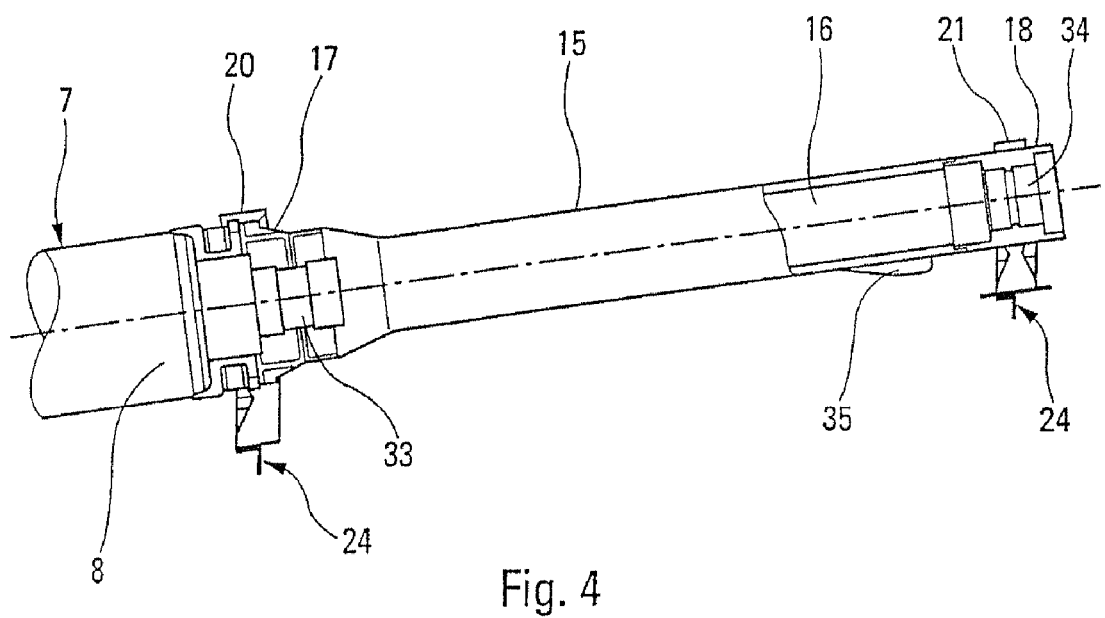
FIG. 4 is an exemplary embodiment of said connecting device.

FIG. 4 is a practical embodiment of the connecting device 1, wherein it may be seen that the front end 17 and rear end 18 of the tubular body 15 comprise respective connectors 33, 34 in which are received fixedly and leak-tightly the connecting boom 7 on the one hand and, on the other hand, the fuel piping (not represented) leading to the tank to be filled, allowing the transfer of fuel from the tanker airplane 4 to the tank of the refueled airplane 1 through the pipe 11, the boom 7, the axial passage 16 of the body and the piping 19. Moreover, a lug 35 for the take-up of the thin plate 32 projects from the tubular cylindrical body 15, on the side of the rear end 18.

Furthermore, as shown in particular in FIGS. 1 and 2, the connecting device 2 comprises a protective cowling 36 enveloping the tubular body 15, the bearings 20, 21 and the proximal ends of the boom 7 and of the piping 19, and applied against the skin of the fuselage.

The invention claimed is:

1. A connecting device for the refueling, in flight, of a refueled aircraft from a tanker airplane provided with a refueling device, said connecting device being able to be carried by said refueled aircraft and comprising:
    a fixed connecting boom, being able to be fixed as a protrusion to the nose of said refueled aircraft, said connecting boom being hollow and able to cooperate with said refueling device of said tanker airplane; and
    a support structure, able to be fixed to the fuselage structure of said refueled aircraft and serving as a rigid base fixed to said connecting boom, said support structure being provided with an internal passage in communication with said connecting boom, wherein said support structure comprises,
        a tubular cylindrical body, of which the longitudinal axis may be disposed parallel to the fuselage structure of said refueled aircraft, said tubular cylindrical body comprising said internal passage;
        at least two parallel bearings, fittingly surrounding said tubular cylindrical body respectively in the front part and in the rear part of the latter, said bearings being able to be fixed to said structure of the fuselage structure, and able to take up the radial loads applied to said tubular cylindrical body and engendered and transmitted by said connecting boom; and
    an element for longitudinal locking of said tubular cylindrical body along its longitudinal axis, able to associate said tubular cylindrical body with said structure of the fuselage structure and able to take up the axial loads applied to said tubular cylindrical body and engendered and transmitted by said connecting boom.

2. The device as claimed in claim 1, wherein said bearings are respectively situated in line with the webs of the transverse frames of said structure of the fuselage structure and fixed to them by way of the skin of said fuselage structure.

3. The device as claimed in claim 1, wherein said bearings are arranged substantially in the neighborhood of the ends of said tubular cylindrical body, and said longitudinal locking element is situated between said bearings.

4. The device as claimed in claim 1, wherein said bearings have a relatively narrow width in comparison to their internal diameter receiving, with adjustment, said tubular cylindrical body.

5. The device as claimed in claim 4, wherein the ratio of the internal diameter to the width of each bearing is of the order of 10.

6. The device as claimed in of claim 1, wherein said bearings are smooth or have an elastic and articulation.

7. A connecting device for the refueling, in flight, of a refueled aircraft from a tanker airplane provided with a refueling device, said connecting device being carried by said refueled aircraft and comprising:
    a fixed connecting boom, which is hollow and able to cooperate with said refueling device of said tanker airplane; and
    a support structure, fixed to the fuselage structure of said refueled aircraft and serving as base fixed to said connecting boom, said support structure being provided with an internal passage in communication with said connecting boom, wherein said support structure comprises,
        a tubular cylindrical body comprising said internal passage;
        at least two parallel bearings, carrying said tubular cylindrical body and fixed to said structure of the fuselage structure, and able to take up the radial loads engendered and transmitted by said connecting boom; and
        an element for longitudinal locking of said tubular cylindrical body along its longitudinal axis, associating said tubular cylindrical body with said structure of the fuselage structure and able to take up the axial loads engendered and transmitted by said connecting boom, wherein:
    said longitudinal locking element comprises at least one thin plate forming a panel, disposed along the vertical longitudinal plane of said tubular cylindrical body, orthogonally to said bearings, and joining said tubular cylindrical body to the skin of the structure of the fuselage structure.

* * * * *